(12) United States Patent
Keibel et al.

(10) Patent No.: US 10,037,019 B2
(45) Date of Patent: Jul. 31, 2018

(54) SYSTEM COMPRISING DEVELOPMENT ENVIRONMENTS AND MACHINE CONTROLS

(75) Inventors: Andreas Keibel, Augsburg (DE); Torsten Goroll, Dachau (DE)

(73) Assignee: KUKA Deutschland GmbH, Augsburg (DE)

( * ) Notice: Subject to any disclaimer, the term of this patent is extended or adjusted under 35 U.S.C. 154(b) by 199 days.

(21) Appl. No.: 13/521,525

(22) PCT Filed: Dec. 29, 2010

(86) PCT No.: PCT/EP2010/007961
§ 371 (c)(1),
(2), (4) Date: Jul. 11, 2012

(87) PCT Pub. No.: WO2011/085799
PCT Pub. Date: Jul. 21, 2011

(65) Prior Publication Data
US 2012/0324415 A1    Dec. 20, 2012

(30) Foreign Application Priority Data

Jan. 13, 2010    (DE) .................. 10 2010 004 473

(51) Int. Cl.
*G05B 19/4097*    (2006.01)
*G06F 9/44*    (2018.01)
(52) U.S. Cl.
CPC ............................ *G05B 19/4097* (2013.01)
(58) Field of Classification Search
None
See application file for complete search history.

(56) References Cited

U.S. PATENT DOCUMENTS 7,050,859 B1 * 5/2006 Govindaraj et al. ............... 700/1
8,175,861 B2 * 5/2012 Huang et al. ..................... 703/13
(Continued)

FOREIGN PATENT DOCUMENTS

DE    100 21 698 A1    3/2001
DE    103 07 261 A1    9/2004
(Continued)

OTHER PUBLICATIONS

Kyoichi Tatsuno, "An example of open robot controller architecture", Nov. 7-9, 2005 0-7803-9482-8, Micro-NanoMechatronics and Human Science, 2005 IEEE International Symposium.*
(Continued)

*Primary Examiner* — Wynuel Aquino
(74) *Attorney, Agent, or Firm* — Wood Herron & Evans LLP

(57) ABSTRACT

The invention relates to a system having one or more development environments (2) for creating machine programs (6), in particular robot programs, and one or more machine controls (12), in particular for controlling robots. One or more machine controls (12) are represented in a development environment (2). The system is configured for the regular transmission of data from one development environment (2) to a machine control (12) and/or the reverse. A development environment (2) and a machine control (12) each preferably comprise a database (1*a* and 1*b*). The representation of a machine control (12) in a development environment (2) is carried out in that the affected databases (1*a* and 1*b*) are synchronized. Furthermore, a development environment (2) can react to changes in a machine control (12) represented therein. The invention further relates to a method for operating in such a system and a related computer program product.

14 Claims, 3 Drawing Sheets

(56) References Cited

U.S. PATENT DOCUMENTS

| | | | |
|---|---|---|---|
| 8,200,886 B2* | 6/2012 | Ogle | 711/103 |
| 8,301,421 B2* | 10/2012 | Bacon et al. | 703/2 |
| 2004/0103411 A1* | 5/2004 | Thayer | 717/171 |
| 2007/0244599 A1* | 10/2007 | Tsai et al. | 700/245 |
| 2008/0050192 A1 | 2/2008 | Suzuki | |
| 2008/0133052 A1* | 6/2008 | Jones et al. | 700/245 |
| 2008/0141220 A1* | 6/2008 | Kim et al. | 717/120 |
| 2009/0157224 A1* | 6/2009 | Blanc | B25J 9/1674 700/250 |
| 2009/0306823 A1* | 12/2009 | Baltes et al. | 700/245 |
| 2013/0253701 A1* | 9/2013 | Halloran et al. | 700/245 |

FOREIGN PATENT DOCUMENTS

| | | |
|---|---|---|
| DE | 10 2007 014 271 A1 | 10/2007 |
| EP | 1 315 057 A1 | 5/2003 |
| WO | 2009149805 A1 | 12/2009 |

OTHER PUBLICATIONS

European Patent Office; Search Report in International Patent Application No. PCT/EP2010/007961 dated Mar. 7, 2011; 4 pages.
German Patent Office; Search Report in German Patent Application No. 10 2010 004 473.3 dated Dec. 9, 2010; 4 pages.
European Patent Office; Examination Report in European Patent Application No. 10 798 275.3 dated Feb. 2, 2015; 4 pages.

* cited by examiner

SYSTEM COMPRISING DEVELOPMENT ENVIRONMENTS AND MACHINE CONTROLS

The present invention relates to a system with one or more development environments for the designing of machine programs, in particular robot programs, and one or more machine control units, in particular for controlling at least one robot. It further relates to a process for the preparation of machine programs or for controlling one or more machines, which is running with such a system, and a computer program product with a program code that executes such a process, when it is run in such a system. The system, the method and the computer program product are suitable in particular for the creation of robot programs and for the control of robots, but they can also be used for a variety of other machines, especially in automation technology.

The work environment and the process, which typically are used to create a program for controlling a complex machine such as an industrial robot or a machine tool, consist of a variety of components or steps. These are described on the example of generating a control program for an industrial robot according to the unpublished international application PCT/EP2009/003443 of the Applicant as follows:

First, in a simulation program, a model of the automation cell is created, in which the robot is later to wok. The model comprises, for example, the robot itself with tools, a transport or chucking device for workpieces, the workpieces, as well as additional facilities such as tool exchange stations or material feeding devices. In the model of the automation cell, there is prepared a line, which will move a tool, for example, along a workpiece contour—for example, a welding line. Then the movements of the robot are generated with a virtual robot controller and simulated such that the tool follows the previously created tool path. After that, using a robot control algorithm the thus created movements of the robot are transformed into a concrete robot control program. This is now manually transferred to the control of the actual robot and tested with data obtained from the real automation cell.

This approach has the disadvantage that the data in the simulation environment can differ from the real data from the automation cell. As a consequence, the so created robot control program must be often corrected prior to the actual practical use. This is done for example by the so-called "subsequent teaching", wherein one or more positions on the robot path are run manually with the robot to make the control aware of these positions and to write, in this way, incorrect positions of the created robot program. Moreover, the data becomes obsolete in the simulation environment, because changes in reality are not transferred back into the simulation environment.

The technical task of the present invention is to improve the preparation of a machine program.

This technical task is resolved by a system having the features of claim 1. Further advantageous embodiments of the invention will become apparent from the dependent claims. Claim 14 provides protection for a corresponding method, claim 15 provides protection for a corresponding computer program product with a program code.

An system according to the invention comprises one or more development environments and one or more machine control units for one or more real machines.

Under a development environment, we understand in particular a work environment that comprises components that are typically used by a developer to develop programs, in particular, machine programs, for example, simulation programs, code generators and/or textual or graphical editors for editing of machine programs or other data.

A machine program may comprise in particular a sequence of control instructions for a program-controlled machine, preferably an industrial robot or a CNC machine tool.

Data in the development environment can be, for example, machine configuration data, i.e., data that describe the kinematics, location, dimensions, features and/or components of the machine as well as their interaction and/or mechanical and/or electrical performance of the machine. Furthermore, such data may be data about the structure model of the automation cell and the workpieces to be processed, identified, for example, by their coordinates in a world coordinate system. The data can also comprise generated robot control programs with their individual steps to be executed.

According to the invention, in a development environment, a preferably accurate and/or current image of one or more machine control units is provided. The term "image" means that data of the respective machine control are present also in the development environment, preferably in the same manner. For this purpose, data from the machine control—such as machine configuration data and geometry data of the automation cell—are transferred, preferably with a very high (about numerical) precision, i.e., exactly and/or with as small time delay as possible, into the development environment. The image of the machine control system in the development environment can be updated, as often as possible and as quickly as possible, according to the changes that occurred in machine controller.

The updating rate or the maximum time delay of the update after a change is, for example, 1 s and preferably 10 ms. The accuracy of the image is determined, for example, by the percentage amount of deviation of a model response to an input in a development environment, in which a machine control system is shown, by a system response to the same input in the machine control, wherein the deviation is, for example, at most 10% and preferably at most 2%.

According to the invention, data is transmitted regularly from at least one development environment to at least one machine control and/or from at least one machine control to at least one development environment.

Data can be transferred, in a temporally discrete fashion, in particular event-dependent, such as data available in case of a change in a machine controller or in a development environment, or of a state of a controlled machine or its environment, in order to reduce the data transfer volume. Data can also be transferred continuously or almost continuously in time, in particular with very short intervals, in order to ensure a high timeliness of the data. Both aspects can also be combined with each other in that, on the one hand, data is transmitted at predetermined periodic intervals, and on other hand, additionally in an event-dependent mode in order to obtain a favorable ratio of data transfer volume and timeliness.

The data can be transmitted in both directions. Thus, for example, machine configuration data can be transferred from the machine control to the development environment and after changes back again. This procedure is known as "machine data round loading".

Machine programs can also be transmitted in both directions: for example, after their preparation in the development environment to be run in the machine control and after any revisions, which have occurred due to deviations of the real automation cell against the simulated automation cell, they can be transmitted back again from the machine control to the development environment. There, they can once again be tested, simulated and/or optimized and then transferred back into the machine control. This procedure is referred to as "program round loading".

By thus created precise and/or current image of the machine control system in the development environment increases productivity of the development environment by eliminating redundant work caused by inaccurate modeling and simulation data, as well as additional iterations in the development process to align the data on the two sides. This increases the likelihood that the generated machine programs run without error without any subsequent corrections. With the available exact data, the quality of the simulations is increased.

The mapping of the machine control into the development environment is preferably done not only during the programming and creation phase, but also later during the ongoing operation of the automation cell. Thus, the development environment continues to be promptly informed of events in the production environment and thus the possibility is created to respond to such events, in manual or automatic manner. Examples of such events are changing, unpredictable positions of a robot or other machines, user actions or errors that occurred during production. The response to such an event on the part of the development environment can consist in a simulation of the impending actions of the machine control. This simulation should preferably occur faster than in real time, i.e., that a (partial) result of the simulation is already present, before the first of the imminent actions of the machine control has begun. Then, the result of the simulation can be used to trigger an interference with the machine controller, before the imminent and potentially problematic actions are performed. For example, the robot can be stopped in time, before it collides with another robot.

The previously described arrangement of a development environment and a machine control system can also be expanded to an arrangement of multiple development environments and/or multiple machine control systems. In this case, at least one machine control system is represented in in a development environment. In this way, resources available in the whole automation system can be bundled in an optimal way by, for example, representing multiple robot control units in a powerful development environment.

In a preferred embodiment of the invention, at least a part of the data, for example, the machine configuration data are present in a markup language, in particular in XML format. XML ("Extended Markup Language") is a description language for hierarchical data structures, which represents a de facto industry standard. The data can be in text form, and thus can be described machine-independently in a tree structure, and the nodes of the tree can be marked by "tags", which are freely selectable depending on the application. In this way, a universal, flexible description language arises for data structures, which can be specialized for the relevant application case by setting the conventions, in particular the tag names. XML data can be stored in the form of text files in the appropriate environment, such as a file system. The data can be automatically extracted by an appropriate parser and further processed or XML representations can be generated by suitable generators from machine-readable data.

In a preferred embodiment of the invention, one or more development environments and/or one or more machine control units comprise in each case a database, in which at least some of the data of the development environment or the machine controller is stored.

Databases have the advantage that data of different types can be efficiently stored in them and retrieved. These functions are performed by a database management system belonging to the database. Operations with the data, such as creating, modifying, and deleting them, can for example be carried out in the form of transactions, where a transaction represents a set of related operations with different data in the database. Preferably, the transactions meet the so-called "ACID" principle ("Atomicity, Consistency, Isolation, Durability"): An atomic transaction is when the transaction is performed either entirely or not at all. Consistency means that after the transaction the database is (again) in a consistent state. Isolation means that various transactions being executed do not affect each other. Finally, durability means that the result of a successfully completed transaction remains persistently in the database.

For databases and associated database management systems, there exist a variety of standard products that can be used directly for this purpose. Preferably a hierarchical database is used as the database. In it, the elements to be stored form a hierarchy or tree structure, in which each data element (except for the root) is derived from a more general "parent element". Hierarchical databases are therefore particularly well suited for storing data provided in XML format. For this purpose, there are special "XML databases" available on the market. However, there can also be used other types of databases, such as relational or object-oriented databases.

By using a hierarchical database, we can easily meet the requirement that all data elements must be clearly identifiable. In a hierarchical database, the hierarchy path in conjunction with the data element's name can be used as an identification of the data element. This designation is then unambiguous, provided that no data elements with the same name are stored in a node of the hierarchy.

At the same time, a hierarchical database provides the ability to store both abstract and specific data elements. A specific data element, which was generated from an abstract data element, can then be arranged in the hierarchy below the abstract data element to illustrate the relationship between the two data elements. Moreover, in a hierarchical database, there exists the ability to block certain branches of the hierarchy in order to, for example, exclude them from synchronization with other databases.

In a preferred embodiment of the invention, the data transmission between a development environment and a machine control system is implemented in that at least a part of the database in a development environment is synchronized with a part of the databases in one or more machine control units. Under this, we understand the matching of the respective parts of the participating databases with the goal that the data in those parts of the databases correspond to each other as far as possible, in particular, are identical.

In this embodiment, the imaging of a machine control in a development environment is done by an initial synchronization of the databases with each other on the both sides. The initial synchronization of the databases can be accomplished by simply copying the data from one side to the other side.

It is possible to synchronize only that data, which are of interest also on the other side. For example, if the source code of the machine programs created in the development environment is not needed in the machine controller(s), this source code need not be synchronized between the source database. To this end, each element in a database can be provided with a property, which explicitly indicates, whether the relevant data element is to be synchronized or not. If the database is a hierarchical database, it is not unconditionally necessary to set this property individually for each data element. Rather, the property can be taken over from the respective parent element of the data element, thereby reducing the total amount of data.

Different modes are possible for the synchronization of a number of databases: For example, the involved database management systems can check at periodic intervals, for example, about once every second, if a data element has changed in one of the databases involved, and then change this data element in the other database accordingly. The subsequent reproduction of the change of a data element can also be triggered by the change of the data element itself so that the matching process the data occurs immediately or with a minimal delay. Additionally or alternatively, the matching of the data can also be performed upon the explicit instruction of a user.

Based on the type of a data element, it is possible to define for the synchronization, on which side is the "original" state of the data element and on which side is merely a copy of the data element ("Master-Slave Replication"). For example, modifications in the geometry of the automation cell can only be taken over from the database to the machine control into the database in the development environment, but not vice versa, because the development environment cannot influence the reality in the automation cell. However, for example, machine programs can be transmitted in both directions, because they can be changed both when they are created in the development environment and when they are corrected the machine control.

Similarly, there are possible the so-called synchronous replication, in which conflicts, that is mutually inconsistent states of the same data element in different databases, can be avoided from the outset ("conflict prevention") and the so-called asynchronous replication, in which conflicts are temporarily tolerated and an attempt is made at a later synchronization of databases to resolve such conflicts ("conflict resolution").

In a variant of this preferred embodiment of the invention, at least one data element stored in a database is assigned one or more instances of one or more computer programs, can process or monitor the data element. When the same computer program is to be used for processing and monitoring various data elements (in terms of a sequence of steps), it may be useful to instantiate this computer program several times. Each instance of the computer program so generated is then assigned to a particular data element that is to be processed and monitored. Such computer programs or their instances, which execute such tasks separately or in combination with each other, are also called "software agents".

Such instances of computer program can either run in a development environment and/or in a machine controller. This ensures that a user can also process the data elements assigned to the computer program instances in the databases, when a development environment and a machine controller imaged in it are temporarily disconnected.

The processing of a data element may consist, for example, in reading a value for the data element by means of an interface, recreating the data element with the value read, changing the data element, i.e., assigning to it another value, converting the data element of a type into another type, generalizing a specific data element into an abstract data element or specializing a data element in a reversed fashion, reading the value of a data element or deleting the data element. The monitoring of a data element by a computer program instance may consist, for example, in executing a specific action based on a change of the data element, e.g., in triggering a message when the value of the data element leaves a predetermined range. The computer program instances, which are assigned to a data element stored in a database, run in the database management system that is assigned to the database, preferably parallel in the form of simultaneously executed processes or in the form of a plurality of concurrently running threads within a process.

In an embodiment of the invention, a development environment is set up to respond to changes in a machine controller, which is imaged in it. Also the possibility of such a response can be used for the purpose of monitoring. In this case, however, it is not about monitoring individual data elements in a database, but rather about monitoring of a machine controller by a development environment in which the machine control system is simulated. Such monitoring can also be carried out during operation, i.e., during the execution of the actual machine program, and the goal is to detect operational problems at an early stage and avoid them.

Such problems may consist, for example, in that a robot collides with 20 another robot or some other machine, such as a conveyor, that a workpiece is dropped when handled by a robot or is lost in other ways, or that when loading or unloading a machine, an unstable load is created, i.e., that the machine is mechanically stressed in such a manner that exceeds its static and/or dynamic limit, which may result in a malfunction or even damage of the machine and/or the workpiece.

The response of the development environment to a change in the machine control system can in turn cause a change in the machine control system, for example, by stopping the machine and/or repeating a step of the machine program, as in the case of a lost workpiece. However, the response can also be independent of the machine control system, for example, by showing a message to the user on a pop-up window on a screen.

It is also possible to install the software required for such monitoring on the machine control unit itself. However, the arrangement of the monitoring software in a development environment as proposed by the present invention has several advantages:

First, the hardware, on which the monitoring software is installed, can be kept always up-to-date without having to intervene in the relatively expensive hardware of the machine control unit or even replacing it. On the side of the development environment, however, generally ordinary industrial PCs can be used as hardware, which can be replaced with much lower costs than the highly specialized hardware of the machine control system. Thus, the monitoring system can participate, in a simple and inexpensive way, in any further development, for example, in terms of computing power or memory, thereby increasing the efficiency of the monitoring system accordingly.

The relocation of the monitoring software from a machine control system to a development environment has the further advantage that the monitoring software can either "connected to different machines in the entire automation system, i.e., each machine control system simulated in the development environment can be monitored in this way to identify critical points in the operation or already in the commissioning process. This is made possible by the novel feature that several machine control systems can be simulated in the same development environment.

Furthermore, the software components already existing in the development environment, such as visualization devices for automated processes or conditions can also be used for the monitoring, which results in synergies in the system architecture and the software development.

In addition, during the production the monitoring can be used to improve the production process. For example, if it is found by the monitoring software that, due to a change in the automation cell, the machine control unit has performed a local change in the movement path of a robot, this may be used in the development environment as an opportunity to newly plan and optimize the entire trajectory of the robot, taking into account this local change in the automation cell. In this way, the cycle time can be reduced.

In case of recognition of a problem in the real production as indicated in the above-mentioned examples, it is also possible to stop the machine using its control system, or at least to interrupt the running of the machine program and execute at this point an error-handling strategy provided by the development environment. For example, if manufacturing tolerances are found in the current production that exceed certain predetermined values, an error handling strategy can consist in that the machine is at first run to a designated parking position and then a calibration of the machine is performed with the goal to re-set the operating parameters of the machine and thus possibly adapt them to new ambient conditions and thus again maintain the allowable production tolerances in the production.

Furthermore, it is possible that the response of a development environment to a change in a machine control system, again, for example, the exceeding of an allowable accuracy value in the production, comprises the determination of a prediction of one or more impending actions of the machine control system.

Such a prediction can be determined in particular by the execution of a simulation in the development environment. In this process, based on the image of the machine control system in the development environment existing at a particular time, a simulation program is started in the development environment, which—taking into account the currently executed machine program—can predict the next steps of the machine control system.

The determination of the prediction, i.e., in particular the course of the simulation, is preferably already completed before the first of the impending actions of the machine control system has begun. This avoids the situation where the potentially undesirable actions in the machine control have already been done before the development environment has the possibility to exert influence on the machine control, for example, by triggering a machine stop.

The method according to the invention for generating machine programs in one or more development environments and to control one or several machines by one or more machine control systems runs in a system consisting of development environments and machine control systems with one or more of the previously mentioned characteristics. According to the method, one or more machine control units are imaged in a development environment. Then data is regularly transmitted from a development environment to a machine control system and/or vice versa, in particular by the synchronization of databases on the two sides.

The invention further comprises a computer program product with a program code, which is stored on one or more machine-readable data media, such as floppy disks, USB sticks or the like, and executes the process described above, if it runs in the system described above. Since this is a distributed system consisting of several development environments and machine control systems with multiple components, the program code has preferably also the form of a distributed software system, and preferably uses the methods of distributed programming, such as the concurrency of processes and threads, or asynchronous communication between the various components.

A system and a method having the features described offer the user a wealth of possibilities for the creation of machine programs that are not yet available in the prior art and that considerably extend the convenience and flexibility of his working process.

Further advantages and features of the invention will become apparent from the dependent claims and the embodiments. They show, partially schematic:

Figure 1:
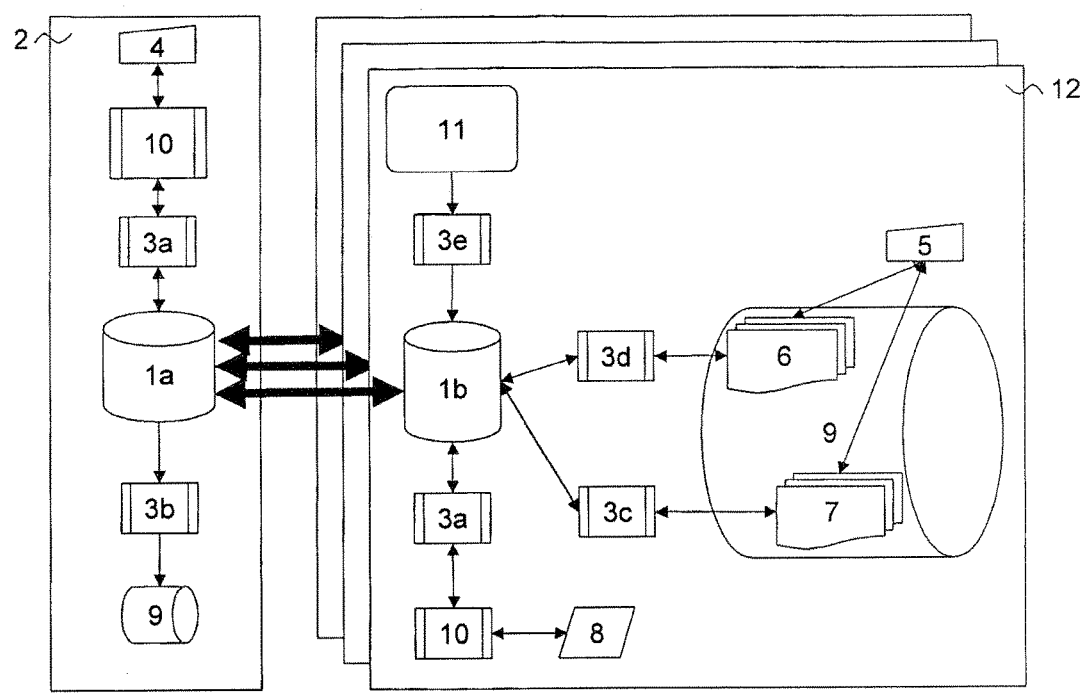
FIG. 1 shows the architecture of the components of a system associated with data storage and processing according to an embodiment of the present invention.

The system shown in FIG. 1 relates to a system, in which three robots with their respective automation cells and their associated machine control units 12 are imaged into a single development environment 2. The figure shows an example of the development environment 2 and a machine control unit 12, wherein two more machine control units are indicated by the underlying framework. A database 1*a* of the development environment is synchronized with a database 1*b* of the machine control unit, which is shown by the lowest of the three black double arrows between the databases 1*a* and 1*b*. The databases of the other two machine control units are also synchronized with the database 1*a* of the development environment (upper and middle black double arrows). While in the database 1*a* of the development environment 2 are stored all data existing in the system, in the database 1*b* of the machine control unit 12 there are only stored data relevant for the associated machine.

FIG. 1 shows various computer programs instances 3*a*-3*e*, which process individual data elements in the databases 1*a* and 1*b*. According to their purpose, the associated computer programs can also be called transformation programs for the data elements.

The computer program instance 3*a* reads out data from the database 1*a* and writes data into it. Thus, it serves as a direct data interface for the database 1*a*. The read-in and read-out data come from an editor 10 or are represented in it. The editor 10 in turn forms the interface to a human user, who performs his inputs through the editor 4, or receives the outputs of the system through the editor 10 by processing files in the editor 10 or getting them displayed there.

The computer program instance 3*b* writes data from the database 1*a* into the file system 9 (not shown) of a development and simulation computer in the development environment 2. This data can be, for example, simulation programs or tool or machine paths generated in the development environment.

The computer program instance 3*b* can be an instance of the same computer program, of whose instances 3*c* and 3*d* an image is formed in the machine control unit 12. Here, the program instance 3*c* serves for writing and reading machine configuration files 7 into and from a file system 9 of the machine control unit 12. The computer program instances 3*d* serves for writing and reading machine programs 6 into and from the file system 9, accordingly. The program instance 3*d* has, at the same time, the function of a code generator, which generates the machine programs 6 from the data in the database 1b.

Both the machine programs 6 and the configuration files 7 are preferably represented in the XML format and stored in the file system 9. Furthermore, both the machine programs 6 and the configuration files 7 can be manually changed by a user in that he performs the required changes 5, for example, of the corresponding XML files in an XML editor.

The computer program instance 3e serves to convert machine variables 11, which are for example determined in the form of measured values of the axle positions of the robot during the execution of the machine program. The computer program instance 3e converts these machine variables 11 into a format suitable for the database 1b and then passes it to the database 1b.

Just like on the side of the development environment 2, using a computer program instance 3a data can be read from the database 1b into a text editor 10, or read from the editor 10 by the computer program instance 3a into the database 1b. The editor 10 is in turn used by a user, who makes his input 8 into the system or received the output from the system.

In order to correctly process the data elements in the databases 1a and 1b, it is necessary to assign each such data element an instance of the correct computer program. In the development of the system, this assignment can be stored in the form of general rules that assign a certain abstract data type a specific computer program. If now—before or during the running of a machine program 6—a specific data type is instantiated from the abstract data type, then on the basis of the general rule, this data element is assigned an instance of the corresponding computer program, which takes over the processing of the data element during its lifetime. When the lifetime of the data element ends, then at the same time the lifetime of its associated computer program instance also ends.

Figure 2:
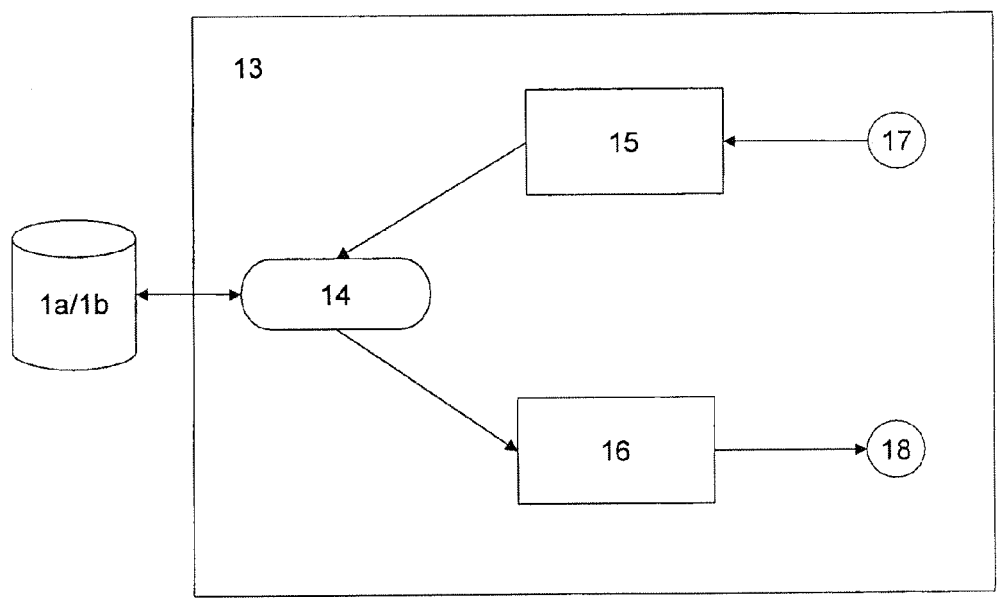
FIG. 2 shows a block diagram of an interface to a database in a development environment or a machine control unit of the system shown in FIG. 1.

FIG. 2 shows in detail the database interface system 13 of a database 1a or 1b. The immediate connection to the database 1a or 1b is provided by the database interface 14. It is fed by a computer program instance 15 for the conversion of the input data, which in turn are input via the input interface 17. Conversely, the data from the database 1a or 1b are output through the database interface 14 to an output interface 18, whereby they may still be first converted by a computer program instance 16.

If the data entered through the input interface 17 have the form of an XML file, in the computer program instance 14 can be, for example, an XML parser, which analyzes ("parses") the XML file, while generating corresponding data files for the database interface 14. Conversely, the program instance 16 can be, for example, a program code generator, which generates an executable program from the data stored in the database 1a or 1b, and outputs it through the output interface 18.

For example, in the case of program code generation, the computer program instance 15 is not necessary, because in this case no data is to be read in. Conversely, for example, in the case of monitoring positions of a machine (for example with the help of machine variable 11 in FIG. 1), there is no need for the computer program instance 16, because in this case, no data are to be generated. The mentioned use of a parser and a program code generation has the advantage that the user can change the machine data without the use of the database 1a or 1b or an editor 10.

Figure 3:
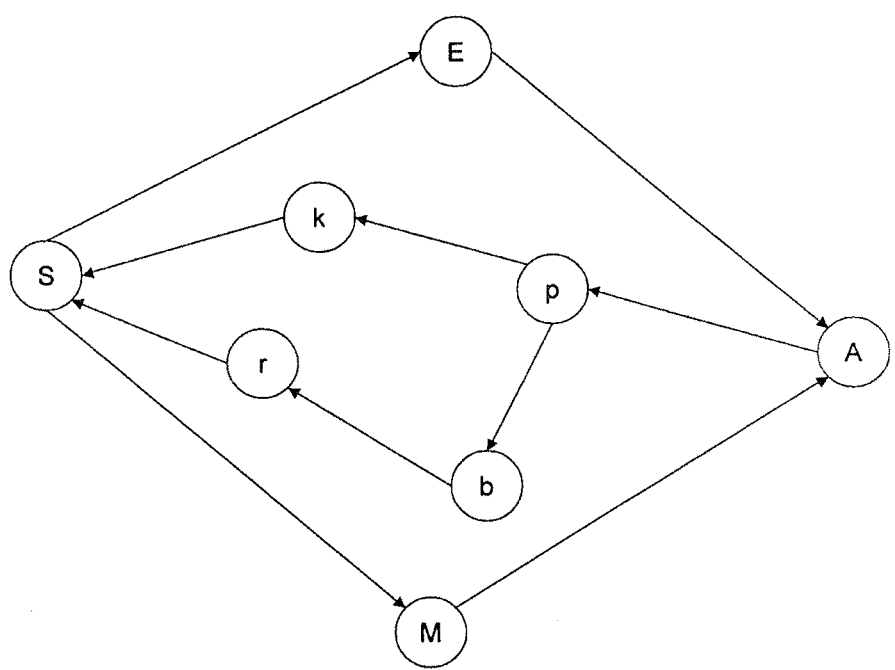
FIG. 3 shows a state diagram for the process of synchronizing two or multiple databases.

FIG. 3 assumes, as an example, that the databases involved are synchronous and coupled (state "Synchronous" or "S"). If now the development environment or the machine control system performs a change in one of the databases (state "Changed by the development environment" or "E" or "Changed by the machine control" or "M"), then the system is in "asynchronous" or "A" state. The change is then be published in all other databases, i.e., a message with the nature of the change is sent to all other databases involved (status "change published" or "p"). Since the participating databases always have to have a mutually consistent state, a published change may only be taken over by another database, if all the databases involved accept this change. If a participating database refuses a published change, for example, because it no longer has enough memory for the reconstruction of a data element, or because an internal error occurred in it (status "change rejected" or "b"), then the published change is reversed in all other databases, which have already executed this change (state "change reversed" or "r"). Even the database, which has published the change, must now reverse this change. In this way, the system is back in the "synchronous" state. The published change has then not been executed in any database. However, if all the participating databases have accepted the published change (state "change accepted" or "k"), the system is also back in the "synchronous" state, and the published change has been made in all databases.

While synchronization is underway between multiple databases, no changes to the data elements to be synchronized are possible. If using a hierarchical database, this can be realized in a simple manner in that certain branches of the hierarchy tree in the database are blocked for changes.

The sequence illustrated in FIG. 3 for the synchronization of two or more databases requires that the participating databases had already been synchronized with each other. An initial synchronization is performed when two databases, which had not yet been connected or which were already connected before, but were separated again in the meantime, are being connected.

The initial synchronization of two databases is different from the sequence shown in FIG. 3 by the fact that it is not triggered by a change to a data element 10. Rather, with different values of the same data element in different databases, it must be initially decided what value the data element will have after synchronization in all databases. This value can be determined, for example, by the latest change to the data element, which requires that in each data element there is stored the date of the last change in the form of a time stamp. Alternatively, also the user can decide what the value the data element will have in all databases after synchronization. The further sequence of the initial synchronization corresponds to the sequence illustrated in FIG. 3.

The sequence in FIG. 3 corresponds to the principle of a "distributed transaction". In the case of a distributed transaction, the above-mentioned ACID principles are also realized: The distributed transaction is atomic, i.e., it is run in all participating databases or in none at all. After the execution of the distributed transaction, the participating databases have again a consistent—here called "synchronous"—state if the state was consistent even before the transaction. The distributed transaction is isolated, because during the execution of the distributed transaction the participating databases are locked for any further changes to the data elements to be synchronized. Finally, the changed made by distributed transaction in the participating databases are again stored permanently.

LIST OF REFERENCE NUMERALS

1a/1b Database
2 Development environment
3a-3e Computer program instances
4 User input in the development environment
5 User changes in the machine control to XML files
6 Machine programs in XML format
7 Machines configuration data in XML format
8 User entries in the machine control
9 File system
10 Editor
11 Machine variables
12 Machine control unit
13 Database interface system
14 Database interface
15 Computer program instance for the conversion of input data
16 Computer program for instance the conversion of output data
17 Input interface
18 Output interface
S "Synchronized" state
E "Changed by the development environment" state
M "Changed by the machine control unit" state
A "Asynchronous" state
p "Change published" state
b "Change rejected" state
r "Change reversed" state
k "Change accepted" state

The invention claimed is:

1. A system comprising:
at least one machine control unit for control of at least one robot; and
at least one development environment for preparing one or more machine programs, in particular one or more robot programs, that, upon execution by the at least one machine control unit, cause the at least one machine control unit to take one or more actions,
wherein the at least one development environment includes a current image of the at least one machine control unit, the system is set up for a periodic transmission of data from the at least one development environment to the at least one machine control unit and/or vice versa, the current image comprising the data that reflects a change made in the machine control unit, the at least one development environment is adapted to simulate the execution of the one or more machine programs by the at least one machine control unit using the current image of the at least one machine control unit, and the at least one development environment is configured to determine a prediction relating to the at least one machine control unit from the simulation,
wherein the prediction simulates the performance of an action of the machine control unit prior to execution of the action by the machine control unit, and the machine control unit uses the prediction whereby potentially undesirable actions are avoided.

2. The system according to claim 1, wherein the periodic data transmission is designed so that the image of the at least one machine control unit in the at least one development environment is accurate and/or up to date.

3. The system according to claim 1, wherein the periodic data transmission is event-driven and/or occurs substantially continuously.

4. The system according to claim 1, wherein the periodically transmitted data comprises one of the one or more machine programs and/or machine configuration data.

5. The system according to claim 1, wherein at least part of the data is given in a markup language, in particular in the XML format.

6. The system according to claim 1, wherein the at least one development environment and the at least one machine control unit each comprise a database in which at least part of data of the development environment and/or data of the machine control unit is stored, respectively.

7. The system according to claim 6, wherein the data transmission comprises a synchronization of at least two of the databases.

8. A system according to claim 6, wherein at least one of the databases is a hierarchical database.

9. The system according to claim 6, wherein at least one data element stored in at least one of the databases is assigned a computer program instance, the computer program instance being operable to process the at least one data element, in particular read in, recreate, modify, transform, generalize, read out and/or delete the at least one data element; and/or monitor the at least one data element, in particular trigger or execute an action based on a change of the at least one data element.

10. The system according to claim 1, wherein the at least one development environment is configured to respond to changes in the at least one machine control unit imaged in the at least one development environment.

11. The system according to claim 10, wherein the response of the development environment comprises determining the prediction relating to the at least one machine control unit, the prediction relating to the at least one machine control unit comprising a prediction of the at least one action.

12. The system according to claim 11, wherein the response of the development environment further comprises stopping of the at least one machine control unit based on the prediction.

13. A method for monitoring at least one machine control unit that controls at least one machine, in particular a robot, comprising:
creating a current image of the at least one machine control unit in at least one development environment, the current image comprising data that reflects a change made in the machine control unit, the at least one development environment adapted to generate one or more machine programs that, upon execution by the at least one machine control unit, cause the at least one machine control unit to take one or more actions;
periodically transmitting data from the at least one development environment to the at least one machine control unit and/or vice versa;
simulating, by the at least one development environment, the execution of the one or more machine programs by the at least one machine control unit using the current image of the at least one machine control unit;
determining, by the at least one development environment, a prediction relating to the at least one machine control unit from the simulation, wherein the prediction simulates the performance of an action of the machine control unit prior to execution of the action by the machine control unit; and the machine control unit using the prediction whereby potentially undesirable actions are avoided.

14. A computer program product for monitoring at least one machine control unit that controls at least one machine, in particular a robot, comprising:
- at least one non-transitory machine-readable medium; and
- program code stored on the at least one non-transitory machine-readable medium and configured, upon execution by at least one processor, to cause the at least one processor to:
- create a current image of the at least one machine control unit in at least one development environment, the current image comprising data that reflects a change made in the machine control unit, the at least one development environment adapted to generate one or more machine programs that, upon execution by the at least one machine control unit, cause the at least one machine control unit to take one or more actions;
- periodically transmit data from the at least one development environment to the at least one machine control unit and/or vice versa;
- simulate, by the at least one development environment, the execution of the one or more machine programs by the at least one machine control unit using the current image of the at least one machine control unit; and
- determine, by the at least one development environment, a prediction relating to the at least one machine control unit from the simulation, wherein the prediction simulates the performance of an action of the machine control unit prior to execution of the action by the machine control unit; and
- use the prediction, by the machine control unit, whereby potentially undesirable actions are avoided.

* * * * *